May 27, 1930. B. B. LEUSTIG 1,760,651
SPRING COVER
Filed Feb. 28, 1925 3 Sheets-Sheet 1

Inventor
Benno B. Leustig
By Bates, Macklin, Goldrick & Teare
Attorneys

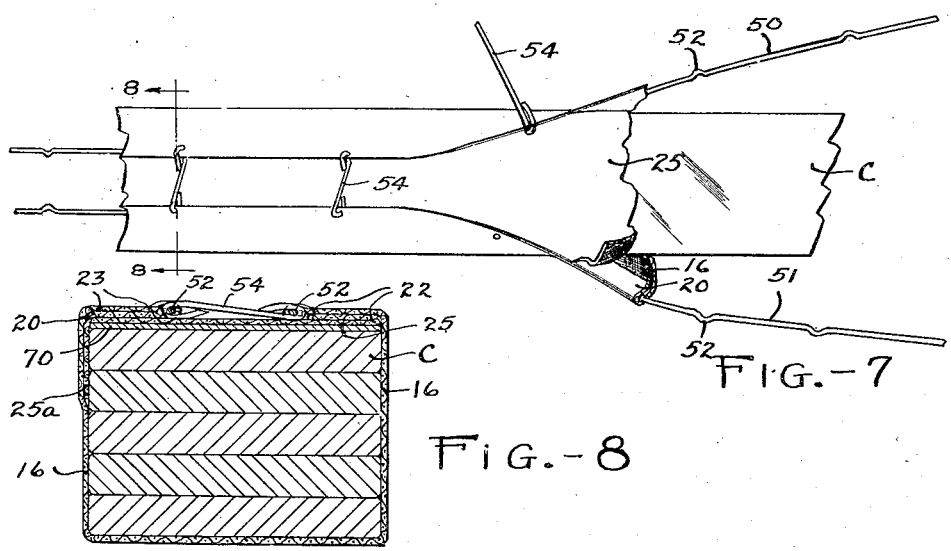
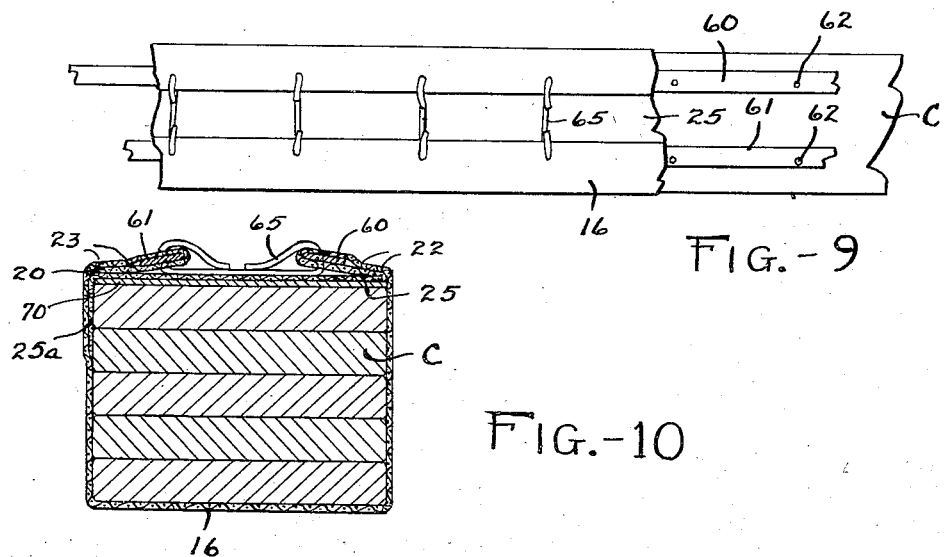

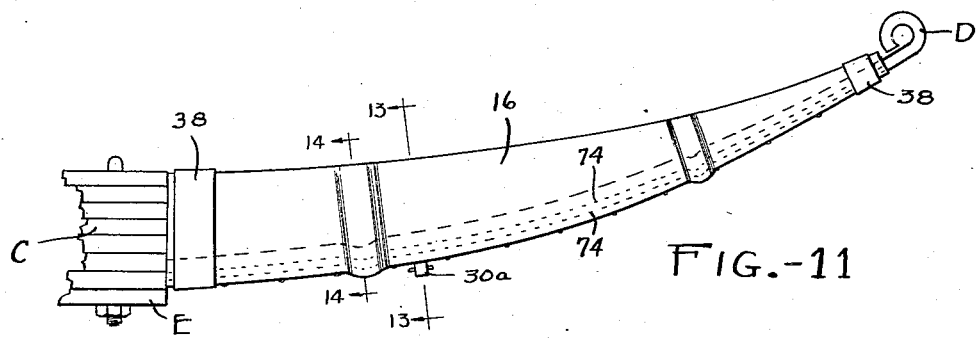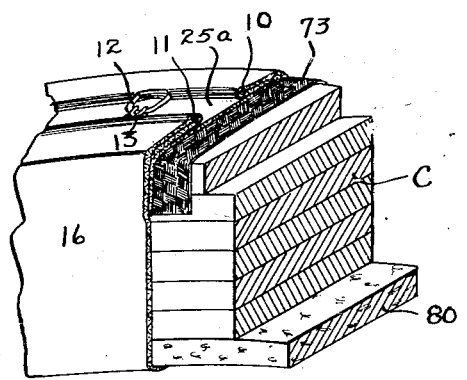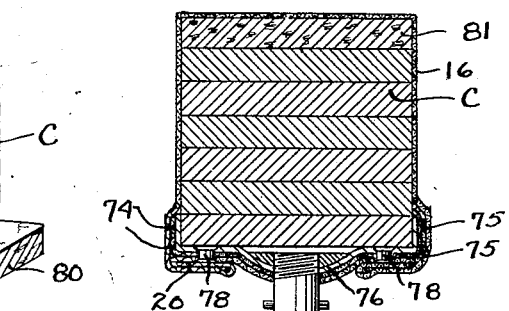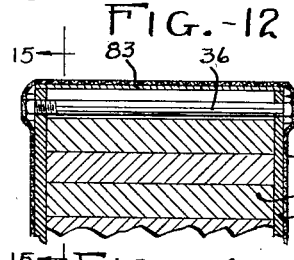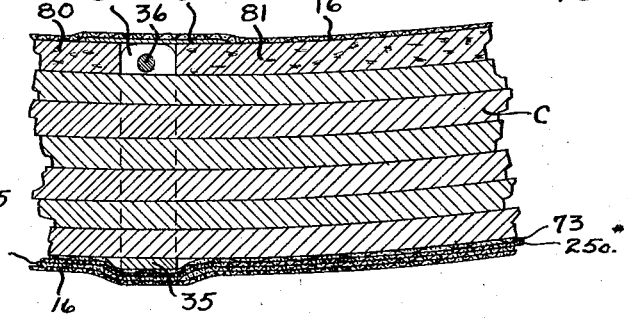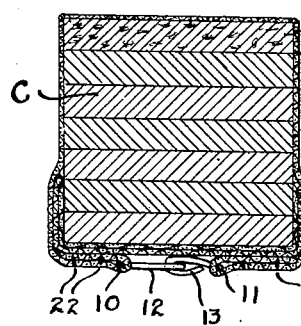

Patented May 27, 1930

1,760,651

UNITED STATES PATENT OFFICE

BENNO B. LEUSTIG, OF CLEVELAND, OHIO

SPRING COVER

Application filed February 28, 1925. Serial No. 12,247.

This invention is concerned with vehicle spring covers and more particularly with covers constructed of fibrous material.

The general object of my invention is the provision of a vehicle spring cover which may be readily applied at any time to the spring of a vehicle, and while of a very economical construction, may be adaptable to the reception of a lubricant forced thereinto under pressure by a grease gun.

More specifically my invention is concerned with a longitudinal closure means for a fibrous spring cover or boot, the closure structure being such that the cover may be readily applied to a vehicle spring to snugly enclose the same while permitting a full flexing movement of the cover throughout its length to conform to the deflecting or rebound movement of the spring.

Other objects of my invention will hereinafter be set forth in the following description referring to the accompanying drawings which illustrate several embodiments thereof. The essential characteristics are summarized in the claims.

Figure 1:
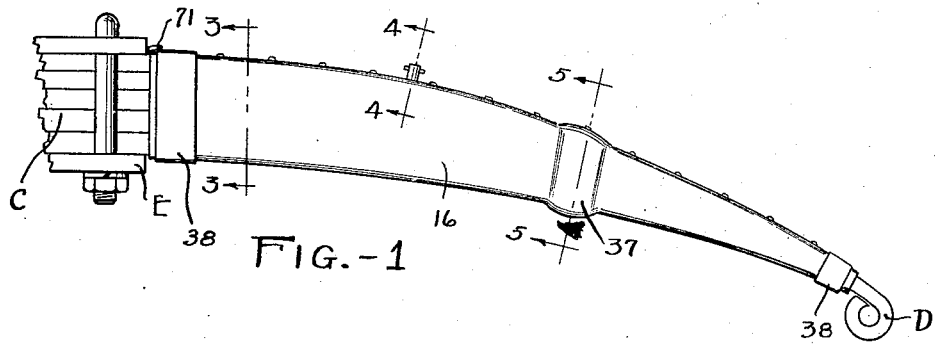
Figure 2:
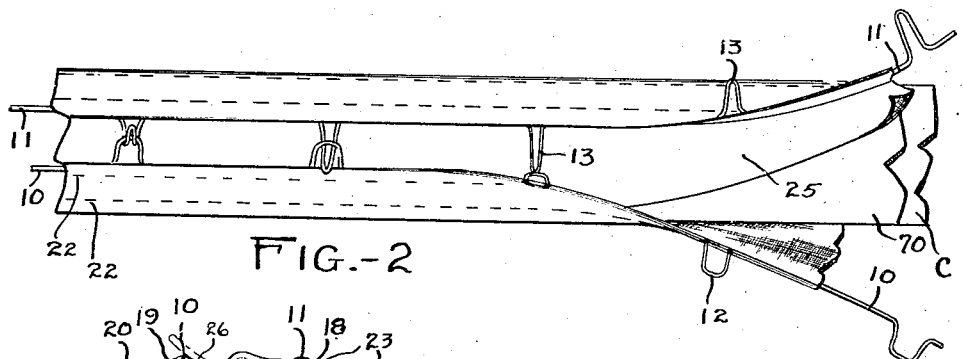
Figure 3:
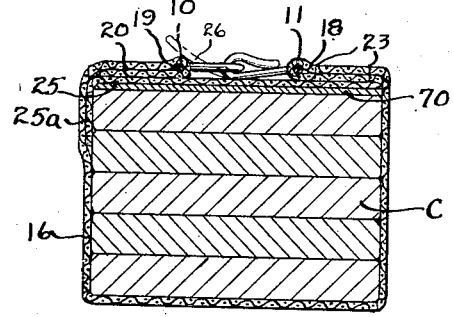
Figure 4:
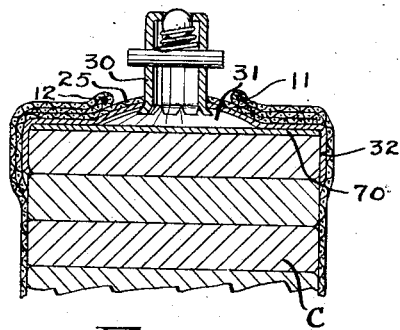
Figure 5:
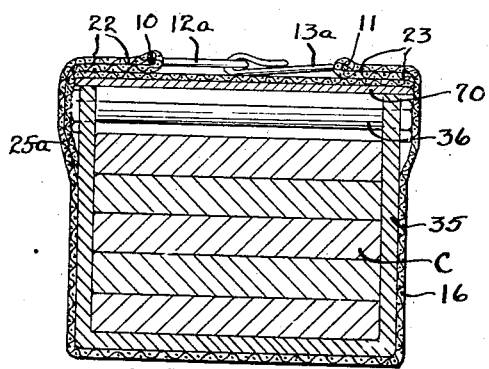
Figure 6:
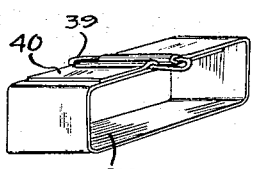

In the drawings, Fig. 1 is a portion of an elliptic spring showing the application of my cover thereto; Fig. 2 is a fragmentary plan view of a portion of the spring and cover illustrating the manner of application of the cover to the spring; Fig. 3 is an enlarged cross-sectional view taken transversely through the cover and spring substantially along the line 3—3 of Fig. 1; Fig. 4 is a similar view taken along the line 4—4 of Fig. 1; Fig. 5 is still another transverse view taken through the spring and cover substantially along the line 5—5 of Fig. 1; Fig. 6 is a perspective view of a closure band adapted to clamp the ends of the cover to the spring; Fig. 7 is a view similar to Fig. 2 but showing a modified form of seam structure adaptable to my cover; Fig. 8 is a cross-sectional view corresponding to Fig. 3 showing a cover in position on a spring with the modified closure means, illustrated in Fig. 7 embodied therein; Fig. 9 is still another form of cover structure; Fig. 10 is a view similar to Fig. 3 showing the modified cover illustrated in Fig. 9 when positioned on a vehicle spring; Fig. 11 is a view of an elliptic spring having a modified form of cover mounted thereon; Fig. 12 is an enlarged cross-sectional perspective view bottom side up of the cover shown in Fig. 11; Fig. 13 is a cross-sectional view taken substantially along the line 13—13 of Fig. 11; Fig. 14 is a fragmentary cross-sectional view taken through the spring and cover; Fig. 15 is a longitudinal cross-sectional view taken substantially along the line 15—15 of Fig. 14 and Fig. 16 is a cross-sectional view similar to Fig. 13.

There has been an extended development in devices which are adapted to be applied to the leaf springs of vehicles which are directed to protecting the springs from moisture and grit as well as to the lubrication of the spring leaves. These devices have been developed along two general lines, namely covers having the bodies thereof formed of flexible material such as textile material or leather and those which are formed of metal, usually articulated sections which permit a flexing movement of the metal cover whereby it may conform to the deflecting movement of the spring to be covered.

The latter class of springs has been found to be quite serviceable, but necessarily expensive relative to the former class and it is with that class of spring covers with which my invention is primarily concerned.

It has been customary heretofore to provide a fabric cover with a longitudinal seam and this seam was closed by either a lacing arrangement or a button arrangement in the form of glove snaps for securing the cover to the spring to be protected and lubricated. A felt wick was usually included within the cover whereby oil was fed along the spring by capillary attraction. When a lacing arrangement was provided, the cover could be closely drawn to snugly fit the spring but the neat appearance thereof was interfered with due to the fact that it was necessary to provide a heavy lacing with attendant wrinkling of the cover of the laced seam. When a glove snap means was provided, it was not unusual that the cover would not fit the spring inasmuch as the so-called standard springs varied in their general dimensions.

My invention accordingly contemplates the provision of a very economical cover which may be formed of suitable fabric and the particular novelty thereof resides in a seam structure which extends longitudinally of the cover whereby it may be applied to the spring either when the vehicle is being manufactured or after it has been in use without necessitating the removal of any bolts or parts of the vehicle spring mounting. This seam structure embodies longitudinally extending flexible metallic members which engage the cover throughout the longitudinal seam edges thereof whereby lateral stresses are evenly distributed and are not concentrated in intermediate places such as has been characteristic of lacing and button snap closing means.

A preferred cover structure embodying my invention is shown in Figs. 1 to 6. In Fig. 1, I show the usual vehicle spring comprising a plurality of spring laminations or leaves C, the bottom one of which is looped as shown at D to afford engagement with a shackle bolt not shown. The cover is shown in position on the spring in Fig. 1 to extend from the shackle bolt to spring saddle or mounting plate E and for full elliptic springs a cover is provided to extend on each side of the plate E but not thereover. In Fig. 2, I show a preferred form of seam structure which may comprise a pair of longitudinally extending rods or wires 10 and 11. These rods are provided with looped portions 12 and 13 respectively, the loops on the rod 10 being of greater width but shorter than the loops on the rod 11 for a purpose to be hereinafter described.

The body of the cover, if desired, may comprise a single layer of fabric 16 of a particular shape to extend around the four sides of the spring and be closed along the bottom of the spring by engagement of the loop portions 12 and 13 of the rods 10 and 11. The body 16 is accordingly provided with longitudinally extending hems 18 and 19 respectively enclosing the longitudinal stretches of the rods 11 and 10. The hems 18 and 19 are slit to permit the extension of the loop portions 13 and 12 therethrough. The hem structure 19 may be formed in the usual manner by a hemming operation namely by simply turning the edge portion 20 of the fabric body 16 under and securing it about the rod by suitable stitches 22. The hem 18 is formed in a similar manner by stitches 23 but the fabric may be again doubled back to provide a flap portion 25 which may extend across the top of the spring with a side portion 25$^a$ thereof extending downwardly a suitable distance along the side of the spring. The loop portions 13 of the rod 11 may originally have a shape such as is illustrated by the dot and dash lines 26 in Fig. 3 whereby the ends thereof curve upwardly from the cover flap thus facilitating the insertion through an engagement with the loops 12. The length of the loops of the respective rods are proportioned whereby when the loops 13 are brought into engagement with the loops 12 and the cover is stretched into snug relation with the spring leaves and these loops are bent to the full line closure or locking position shown, the rods 10 and 11 will be disposed equidistantly from the longitudinal center of the bottom spring leaf.

The means for forcing the lubricant into the cover may comprise a grease gun coupling member 30, as shown in Fig. 4 of a well known type which may be secured to a suitably domed metallic plate 31 adapted to extend along the top spring leaf a short distance. This member may have side legs 32 which may be bent into engagement with and engage the bottom edge of the top spring member as shown in Fig. 4 or it may be secured to the flap portion 25 in a manner to be hereinafter described. The flap portion 25 of the cover may be suitably perforated whereby the plate 31 and nipple 30 if desired, may first be positioned on the spring and the cover applied thereover.

The structure described is readily adaptable in its application to vehicle springs without necessitating the removal of the spring clamp and bolt and as shown in Fig. 5 it will be seen that the spring clamp 35 and spring bolt 36 may be completely enclosed presenting only a slight swelling appearance as shown at 37 in Fig. 1 on the exterior of the cover. The seam of course will be slightly extending laterally at this place, but the nature of the locking or closure means is such that the particular loops 12$^a$ and 13$^a$ will be disposed transversely a little further apart than the rest of the loops, but by reason of the fact that the loop 13$^a$ is of considerably greater length than loop 12$^a$ a neat efficient closure at this particular point will be presented, as shown in Fig. 5.

Any suitable means may be used for clamping the ends of the cover to the spring leaves. In Fig. 6 I show a metallic band 38 which may be provided with a buckle member 39 in the form of a piece of looped wire. A free end 40 of the band 38 may thus be inserted in the member 39 and the metallic band drawn into snug and tight engagement with the exterior of the end portions of the cover.

In Figs. 7 and 8 I show a modified form of seam structure comprising longitudinally extending rods 50 and 51 having spring notches 52 formed thereon which notches may be disposed opposite each other and in alignment with suitable perforations formed in the seam structure hereinbefore described whereby ductile metallic transversely extending members in the form of wire locks 54 may extend through the seams and engage the rods 50 and 51 to secure the cover in place.

In Figs. 9 and 10 I show still another form wherein the longitudinal rods or stay members may comprise flat metallic bands 60 and 61 which may be suitably perforated as shown at 62 to afford engagement with transversely extending ductile metallic members 65. The manner of application of the member 65 will be the same as the members 54 hereinbefore described.

Inasmuch as the seam structure is disposed along the bottom of the spring and not along the top thereof as has heretofore been customary it will be seen that the cover extends over the transverse edges of the spring leaves which edges in time would wear through the cover. I accordingly provide a protective means in all three forms herein described which may comprise a flat metallic strip 70 which may extend throughout the length of the cover and be disposed between the flap portion 25 thereof and the spring leaves. This flat metallic strip may be maintained in position in any suitable manner preferably by extending one end thereof outside of the cover whereby it may be bent upwardly and downwardly over the end closure band 38 which is disposed adjacent to the spring saddle plates.

If desired, the protective strip 70 shown in the three forms of spring cover constructions illustrated in Figs. 1 to 10 inclusive, may comprise a protective means in the form of metallic screening material either of the mesh or braided type which may not only form a protective means but may also comprise a stiffening means for preventing the formation of longitudinal wrinkles in the flap portion when the seam is being closed. Such metallic screening if desired, may be stitched to the cover to be carried on the inside of the flap portion 25 or the flap and screening may comprise a separate structure. Such separate structure would be appliable to the bottom side of the spring to comprise in effect the bottom of the cover with the hemmed edges of the body of the cover overlapping the sides thereof as shown in Figs. 12 and 16. Thus it will be seen in Figs. 12, 13, 15 and 16 that the protective screening 73 may overlie the bottom of the spring. Fig. 12 shows a reversed position of the spring leaves as shown in Fig. 11 and this screening 73 shown as being secured to the flap portion 25$^a$ in a convenient manner which may comprise suitable stitching 74 and 75. If desired, the stitching 74 may extend through the body 16 of the cover.

The nipple supporting means in this structure may comprise the metallic member 76 suitably threaded and secured to the flap and screen structure by rivets 78. The nipple 30$^a$ in this construction will, of course, extend through suitable apertures formed in the screening and flap structure.

I find that the appearance of the cover as well as the snug fitting characters thereof may be enhanced by providing filler strips in the form of cork or other flexible material which may extend on each side of the rebound clips 35 (two clips being shown in Fig. 11) and terminate on each side of the bolts 36 therefor, providing in effect a noninterrupted curved surface along the bottom of the spring structure to which the cover may be readily applied. This arrangement is shown in Figs. 14 and 15 and the fillers comprise members 80 and 81 disposed on each side of the U-shaped rebound clip 35. The thickness of these members, of course, may be substantially equal to the amount of extension of those portions of the spring clip lugs which afford engagement for the bolt 36. As a further protection to the fabric adjacent the clip edges, a sheet metal plate 83 may be provided to extend over the exposed edges of the spring clip as shown in Figs. 14 and 15. This metallic strip may be only of sufficient width to span the ends of the filler members 80 and 81 and the spring clip ends.

It will be seen that by reinforcing the flap portion with a metallic screen lining, that this flap portion may take on sufficient rigidity while remaining flexible relative to the general spring structure to facilitate the drawing together of the seam parts without any resulting wrinkling or buckling longitudinally of the flap, thus greatly facilitating the application of the cover to the spring vehicle as well as furthering the neat and close fitting appearance thereof. The flap structure furthermore may be bent manually to have the free end thereof overlie the side of the spring.

It will be seen that any shift of the stay members or rods during a deflection movement of the spring upon which the cover may be placed is prevented by reason of the loop portions engaging the hem structure of the seam. Likewise it will be apparent that the lock stresses due to the deflecting movement of the spring are not concentrated at any particular point along the seam structure but are distributed in a uniform manner longitudinally of the seam structure. It is also obvious that a cover of standard dimensions may be applied to a spring of corresponding standard size in a tight fitting manner regardless of the variations in the dimensions of the spring. Also it will be seen that a lubricant may be placed within the cover with considerable force by the use of a grease gun thereby assuring the application of lubricants to all portions of the spring leaves. All of the foregoing advantages are obtained in a cover structure which involves only an extremely low manufacturing cost.

Having thus described my invention, I claim:

1. A fabric spring cover having a longitudinal closure seam and looped flexible metallic members built in to the cover structure to extend along said seam, the loop portions of said members being adapted to be brought into engagement to close the cover when in position on a spring.

2. A vehicle spring cover of the character described having a fabric body and a longitudinal closure seam and means for maintaining said seam closed, said closure seam comprising a fabric flap portion, longitudinal stay members overlying the flap portion, means for joining said stays and a grease gun nipple extending through the flap portion.

3. A vehicle spring cover of the character described comprising a fabric member, longitudinal extending stays hemmed by the fabric and formed to have transversely extending interengageable loops.

4. A vehicle spring cover having a fabric body provided with a longitudinal closure seam including a flap portion underlying the seam, metallic stays positioned in hems formed in the fabric to overlie said flap portion, a grease gun nipple extending through the flap portion and disposed between the hems of the cover, and means engaging a nipple adapted to lie under the ends and be positioned thereby.

5. A vehicle spring cover comprising a fabric boot adapted to surround four sides of a multiple leaf spring and having longitudinally extending flexible metallic rods reinforcing the cover and formed to engage each other to hold the cover in a closed condition.

6. A fabric spring cover having a longitudinal closure seam including a flap portion adapted to extend across the top and one side of a spring, metallic members built in to the cover structure to extend along said seam, ductile means including said metallic members and adapted to be bent to engage and lock said metallic members in longitudinal relationship.

7. In a spring cover of the character described a pair of longitudinally extending flexible members engaging the cover along the closure seam thereof, ductile metallic means associated with said members to afford a cover stretching and closure seam locking means therefor, a grease gun nipple and a supporting means therefor over which said metallic members extend.

8. A fabric spring cover having a longitudinal closure seam and looped flexible metallic members built in to the cover structure to extend along said seam, the loop portions of said members being ductile whereby they may be bent to lock the cover when once placed in position on a spring.

9. In a vehicle spring cover of the character described, the combination of a fabric body having a longitudinal extending closure seam structure and a longitudinally extending stretch of fibrous material reinforced by metallic screening to prevent the wrinkling of the flap portion of the cover while the same is being applied to a vehicle spring.

10. In a vehicle spring cover of the character described, a longitudinal seam structure including a flap portion having a flexible metallic reinforcement directed to maintaining the flap portion in a smooth condition.

11. In a vehicle spring cover of the character described, a seam structure comprising a metallically reinforced flap overlying hemmed cover edges reinforced by longitudinally extending metallic members and means engaging said members to secure the cover edges over the flap portion.

12. In a cover for a vehicle leaf spring having clip members thereon, a seam structure comprising longitudinally extending looped stays enclosed in hems formed along the longitudinal edges of a single piece of fabric comprising the cover means for securing the stays together at the loops, and filler members adapted to be disposed intermediate the clip members of the vehicle spring when the cover is placed thereon.

13. A vehicle spring cover of the character described, comprising a fabric body member having its opposite edges adapted to lie on one side of the spring, means for drawing said edges toward each other, a member underlapping both of said edges and extending longitudinally of the spring, said member having an opening, and a grease gun nipple extending through said opening and between said edges.

In testimony whereof, I hereunto affix my signature.

BENNO B. LEUSTIG.